Jan. 12, 1954     E. L. MARTIN ET AL     2,666,091
ELECTRIC STORAGE BATTERY FOR USE IN EXTREME CLIMATES
Filed April 12, 1951     2 Sheets-Sheet 1
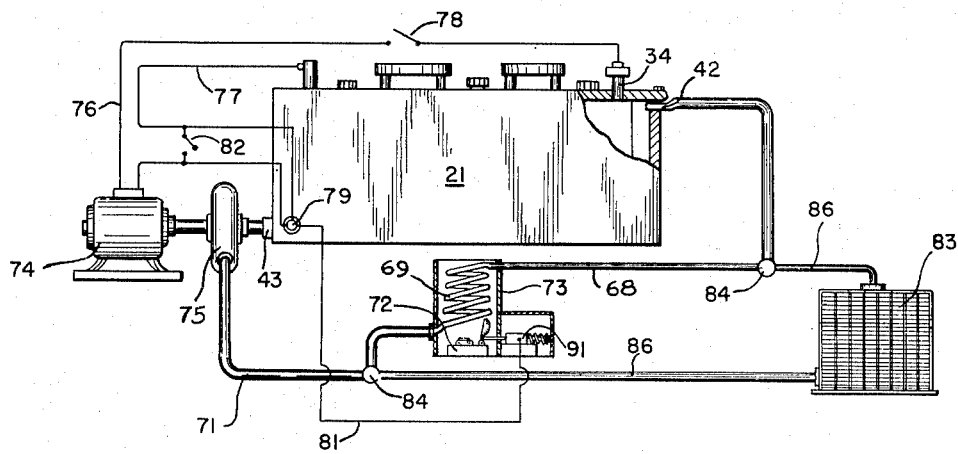
FIG.—1
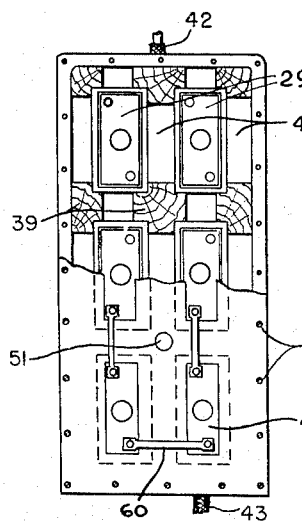
FIG.—2
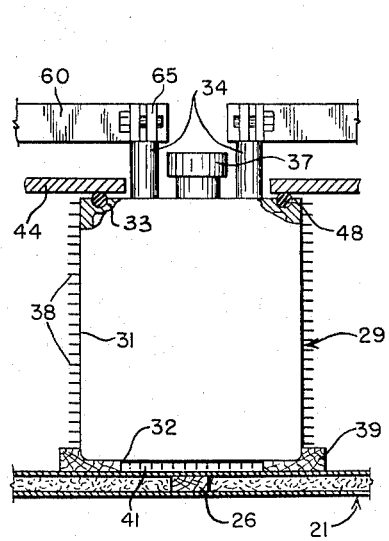
FIG.—3
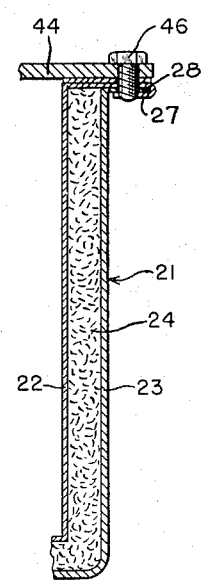
FIG.—4
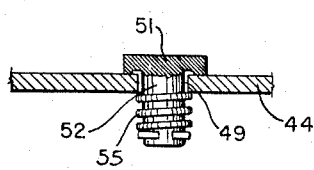
FIG.—5
INVENTORS
Emmet L. Martin &
Howard H. Agee
BY
ATTORNEY Jan. 12, 1954 E. L. MARTIN ET AL 2,666,091
ELECTRIC STORAGE BATTERY FOR USE IN EXTREME CLIMATES
Filed April 12, 1951 2 Sheets-Sheet 2

INVENTORS
Emmet L. Martin &
Howard H. Agee
BY
ATTORNEY

Patented Jan. 12, 1954

2,666,091

UNITED STATES PATENT OFFICE 2,666,091

ELECTRIC STORAGE BATTERY FOR USE IN EXTREME CLIMATES

Emmet L. Martin, Chicago, Ill., and Howard H. Agee, Omaha, Nebr.

Application April 12, 1951, Serial No. 220,624

10 Claims. (Cl. 136—161)

Our invention relates to a storage battery structure incorporating means for varying the battery temperature, and is particularly adapted for use in extremely cold climates.

It has long been recognized that storage batteries decrease markedly in efficiency as the temperature falls, until at temperatures on the order of —65° F. the power available from a storage battery is grossly insufficient for satisfactory operation of internal combustion engine starter and ignition systems. This characteristic is exceptionally objectionable in military vehicles intended for use in the polar or sub-polar regions where low temperatures are frequently encountered since heated shelter is seldom available and emergency conditions may require the immediate starting of a large number of vehicles.

Various solutions to this problem have been proposed, such as forcing heated air around a battery case within which the individual battery cells are disposed, but such proposals have been generally unsatisfactory due to the relatively long periods of time required to bring the battery to a satisfactory operating temperature. Other proposals capable of operation in a somewhat shorter period of time have required the use of an external source of electrical power, which is frequently unavailable.

One of the principal objects of our invention is to provide a multiple cell storage battery constructed and arranged in such manner as to permit the rapid transfer of heat between a circulating fluid and the individual battery cells comprising the battery.

A further important object of this invention is to provide apparatus including a multiple cell storage battery and a heat exchanger for rapidly heating or cooling the battery cells without utilization of an external source of electric power.

An additional object of this invention is to provide a multiple cell storage battery having means for disposing the battery cells within a container in such manner as to provide sealed passageways defined at least in part by the cell walls and bottoms for a flowable heat transfer media.

Other important objects of this invention will be disclosed in the following description and in the appended drawings, in which:

Fig. 1 is a diagrammatic view of a form of our invention;

Fig. 2 is a diagrammatic plan view of a battery incorporating our invention;

Fig. 3 is a section through a portion of the battery shown in Fig. 2, illustrating the position of the battery cell within the case;

Fig. 4 is a partial section through the battery case;

Fig. 5 is a partial section through a vent valve in the battery case cover;

Figure 6:
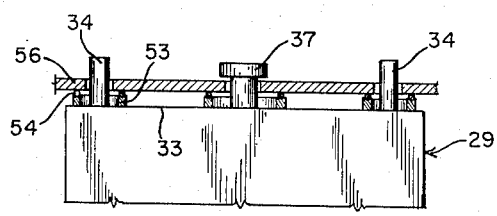
Fig. 6 is a partial elevation through a modified form of battery showing the relationship between the battery case cover and a cell.

In brief, our storage battery includes an insulated container in which a plurality of individual battery cells are mounted in spaced relation to each other and to the container, thus exposing most of the surface of the sidewalls and bottom of each cell to heated fluid circulating through the container. Escape of the heated fluid from the container is prevented by a container cover fitting across the top of the container and sealed to the cells, exposing the cell binding posts and the filler opening. If desired, the cover and the top of each of the battery cells may be formed in such manner as to permit circulation of the heat exchange fluid over the top as well as around the sides and bottom of each cell.

The container is provided with an inlet and an outlet to which conduits are attached, thus forming a closed circuit for the heat exchange fluid. A heat exchanger is connected in the circuit and is supplied with heat from a suitable source, such as a gasoline burner, the operation of which may be terminated by a thermostat disposed in the fluid circuit. The heat exchanger is preferably disposed at a level below the inlet and outlet for the container and may be operated in such manner as to vaporize a suitable fluid, the vapor being subsequently condensed in the container and returned to the heat exchanger by gravity. Preferably, however, the heat exchanger heats a liquid which is circulated through the container around the cells in a closed circuit. Thermal currents developed by the application of heat to the liquid in the heat exchanger will cause circulation of the liquid through the system, but usually at a velocity below optimum. A circulation pump is therefore preferably provided, driven by a small electric motor energized by the battery cells. Obviously cooling of the battery may be effected by reversing the flow of heat through the heat exchanger in a manner well-known in the art.

The general arrangement of the subject invention is disclosed diagrammatically in Fig. 1, wherein we have illustrated a container, generally designated 21, of generally rectangular configuration and suitably insulated for reducing the transfer of heat between the internal and external walls. The container 21 may suitably be formed by disposing a light gauge metal box 22 within a similar but somewhat larger metal box 23, the space between the two boxes being packed with a suitable insulating material 24. Reinforcing material, such as strips of wood 26 may be disposed between the boxes 22 and 23 at suitable intervals to prevent excessive distortion of the boxes. The seams of the inner box 22 should be sealed against passage of fluid, the box 22 also being provided with a laterally extending top flange 27 having a reverse bend formed at its outer extremity for locking engagement with a flange 28 formed on the outer extremity of the outer box 23.

Battery cells, generally designated 29, are disposed within the container 21 and include side walls 31, a bottom wall 32, and a top wall 33. Binding posts 34 project upwardly from each cell through the top 33, the latter also being provided with a filling opening sealed by a cap 37. The material from which the walls of the cell 29 are formed should be selected to yield the maximum rate of heat transfer consistent with the chemical and electrical resistance necessary to house the battery plates and contain the corrosive battery liquid. Hard rubber is suitable for this purpose, but a heat and shock-resistant glass is preferable since it permits a more rapid transfer of heat through the cell wall. The external surfaces of the cell walls may be provided with fins, corrugations, or the like, indicated at 38, to increase the exposed cell surface area for contact with a heat exchange fluid.

The cells 29 may be mounted on supports 39 of wood, hard rubber, or the like shaped to receive each cell at its four bottom corners and extending laterally into contact with the inner box 22 or an adjacent support 39, as illustrated in Fig. 2. Preferably each of the supports is recessed in such manner that each support engages a small portion of the bottom 32 and the side walls 31 of each corner of each cell, thereby preventing shifting of the individual cells laterally within the container. When the cells 29 are positioned on the supports, it will be noted that the bottom 32 of each cell is spaced upwardly from the bottom of the inner box 22 and the side walls 31 of each cell are spaced laterally from the walls of the inner box 22 and from the corresponding walls of adjacent cells, thereby defining interconnecting passageways, generally designated 41, for the passage of heat exchange fluid. A tubular fluid inlet 42 is sealed through a wall of the container 21 near its upper extremity and discharges into one of the passageways 41. A tubular outlet 43 is also sealed through a wall of the container 21, but is disposed near the container bottom in such position as to facilitate the discharge of liquid from within the inner box 22 by gravity.

Loss of heat exchange fluid is prevented by a cover 44 secured along its periphery to the upper portion of the container 21 as by bolts 46. The cover 44 may be a sheet of metal having a plurality of openings 47 formed therein exposing the binding posts 34 and the filler opening 37 of each cell, but extending inwardly over the top 33 of the cells. The top 33 of each of the cells may be grooved to receive a resilient gasket 48 against which the cover 44 exerts a downward force, thus resiliently maintaining each cell in firm engagement with the supports 39. The cover 44 may be provided with a vent opening 49 normally sealed by a valve 51 having a stem 52 extending through the vent opening 49. A spring 55 engages the stem 52 and the lower surface of the cover 44, thus holding the valve 51 in sealing position against the cover 44 except when excessive pressure is developed in the passageways 41.

Figure 7:
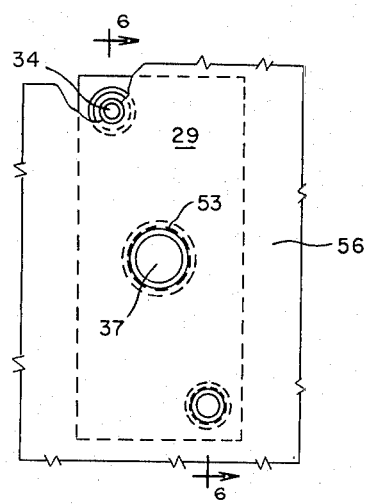
Fig. 7 is a partial plan view of the modified form shown in Fig. 6.

With the battery cells 29 arranged in the manner illustrated in Fig. 3, it will be noted that the sides 31 and the bottom 32 of each of the cells are exposed to the heat exchange fluid, but the top 33 is sealed from the passageways 41 by the gasket 48, and is therefore exposed to ambient temperature. If it is desired to circulate the heat exchange fluid across the top 33 of each cell, a structure of the type illustrated in Figs. 6 and 7 may be employed. In this form of structure collars 53 are telescoped over each of the binding posts 34 and around the filler opening and are preferably sealed at their lower extremity to the top 33 of each cell. The upper extremities of each of the collars 53 preferably are disposed in a common plane and may be provided with gaskets 54 for engagement with a cover plate 56, the latter having suitable openings formed therein permitting passage of the binding posts 34 and access to the filler caps 37. The heat exchange fluid thus may be circulated across the top 33 of each of the battery cells except for that portion of the top area sealed from the fluid by the collars 53.

Figure 8:
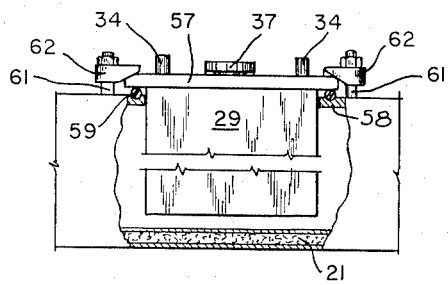
Fig. 8 is a partial elevation illustrating a modified arrangement of battery cells in a battery case.
Figure 9:
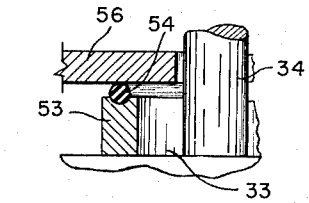
Fig. 9 is a partial section through a portion of the form illustrated in Fig. 6.

The supports 39 may be eliminated by utilizing a structure of the type disclosed in Fig. 8, in which each of the battery cells is provided with an upper laterally extending peripheral flange 57 adapted for engagement with the upper surface of a rigid cover plate 58, thereby suspending the cell 29 in the container 21 in spaced relation to the bottom and to adjacent cells. A resilient gasket 59 may be interposed between the flange 57 and the cover plate 58. To prevent vertical movement of the cells 29, studs 61 may be secured to cover plate adjacent opposite corners of the cells 29 and receive hold down clips 62, which in turn engage the upper surface of the flange 57.

Figure 10:
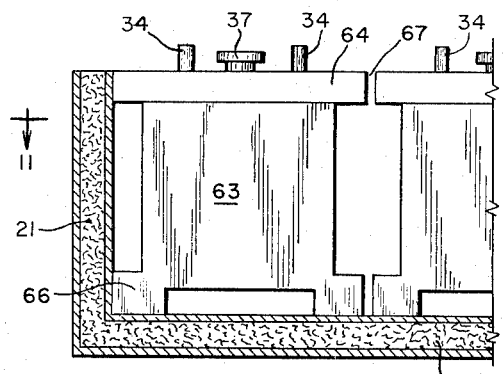
Fig. 10 is a partial section through a modified form of battery cell and battery case arrangement.
Figure 12:
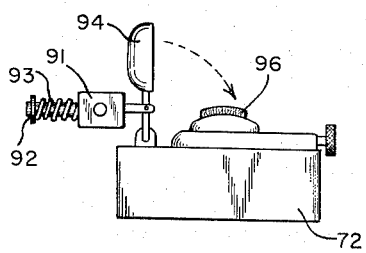
Fig. 12 is a diagrammatic view of a burner.
Figure 11:
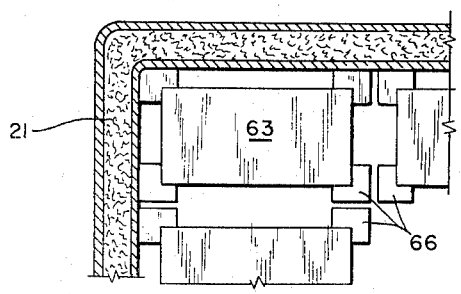
Fig. 11 is a partial plan view of the arrangement illustrated in Fig. 10, the battery case being shown in section.

In Figs. 10 and 11 we have illustrated a structure wherein each battery cell 63 is provided with a laterally extending top flange 64 similar to flanges 57, and with feet 66 disposed near the lower corners of each of the cells and extending laterally in a manner similar to the supports 39 a distance substantially equal to the lateral extent of the flange 64. By properly dimensioning the flange 64 and the feet 66, these elements may be arranged for engagement with the internal walls of the container 21 and with corresponding elements of adjacent cells. The use of a cover plate in this type of structure is not necessary since joints 67 existing between contiguous cells or between a cell and the container wall may be caulked with a suitable plastic material to prevent loss of heat exchange fluid. It should also be understood that if desired the supports 39 or feet 66 may be formed integrally with the inner box 22. Since the cells 29 generate current at approximately two volts, the desired voltage may be attained by connecting the desired number of cells in series, as by connectors 60 having end clamps 65 for attachment to the posts 34. The clamps 65 permit removal of the container cover 44 and subsequent replacement of individual cells.

A conduit 68 connects the inlet 42 with the outlet of the heat exchanger 69, the latter being of any suitable design, for example a helical coil of copper tubing. A conduit 71 connects the outlet 43 within the inlet of the heat exchanger 69, thus establishing a substantially closed circuit for heating fluid. Heat is supplied to the heat exchanger 69 by suitable means, such as a gasoline burner 72 positioned below and within the heat exchanger 69. Preferably a wind shield 73 surrounds the burner 72 and the heat exchanger 69, the assembly being positioned below the container 21 in such manner that exhaust fumes from the burner 72 pass upwardly around the external surface of the container 21.

To control operation of the burner 72, we provide a thermostat 79 normally extending through the wall of the container 21 into contact with a heat exchange media within the container, it being understood, however, if desired, one or more thermostats 79 may be disposed in such manner as to contact the battery fluid within one or more of the battery cases 29. The thermostat 79 is arranged in such manner that below a predetermined temperature its three contacts are interconnected, closing all circuit through the thermostat, the motor 74 and a solenoid 91, pivotally mounted near the burner 72. Solenoid 91 includes a reciprocal core 92 urged by a spring 93 in one direction and pivotally engages a cap 94 pivotally mounted in suitable position, as on the burner 72 for downward movement over a wick or burner element on the burner 72. Energization of the solenoid 91 draws the core 92 inwardly against spring 93 and holds the cap 94 away from element 96 until such time as the contact on the thermostat 79 opens, at which time the spring 93 forces the cap 94 downwardly in an arcuate path to snuff out the flame on the burner element 96. A wire 81 connects the thermostat 79 with the solenoid 91.

The type of fluid utilized as a heat transfer media in our invention is governed largely by the conditions under which the device is expected to operate. It is essential, of course, that the fluid selected have a freezing point well below the minimum temperature expected. Methyl alcohol and ethylene glycol both constitute suitable liquids, although it is to be understood that other liquids exhibiting similar characteristics may be substituted if desired. If the fluid selected is of the type which may be vaporized under atmospheric pressure without decomposition and if the fluid also has a high latent heat, the system may be operated in such manner as to boil the liquid in the heat exchanger 69, thus causing the vapor to flow through the conduits 68 and into the container 21. Within the container the vapor flows through the passageways 41, condensing on the exposed surfaces such as the side walls 31 and the bottoms 32 of the cells 29, discharging its latent heat and returning by gravity in liquid form to the heat exchanger through the outlet 43 and the conduit 71.

If a liquid such as ethylene glycol is employed, it is usually preferable to simply heat the liquid in the heat exchanger 69 and circulate the heated liquid through the passageways 41 in intimate contact with the exposed walls of the cells 29. In the type of system described, circulation will occur naturally by thermal currents but the velocity thus induced will be below the optimum for heat transfer. We therefore provide a pump 75 disposed in the fluid circuit preferably near the outlet 43 for forcibly circulating the fluid through the container 21 and the heat exchanger 69. A small motor 74 is coupled to the pump and is energized from the battery cells 29 through conductors 76 and 77, the former including a switch 78 for breaking the circuit to the motor 74.

The conductor 77 is connected to the motor 74 through the thermostat 79, which contains conventional switch elements adapted for opening the motor and solenoid circuits when the temperature of the heat exchange fluid, in which the thermostat 79 is immersed, exceeds a predetermined temperature. A switch 82 may be provided for permitting operation of the motor 74 when the thermostat switch is open, as for example when it is desired to cool the battery cells.

To cool the cells 29, the chimney 73 may be removed from about the heat exchanger 69, and a blast of cool air, as from the engine fan directed over the device by suitable baffles, not shown. Alternatively, a cooling unit 83 may be provided and connected in the fluid circuit by two-way valves 84 and conduits 86. The type of cooling unit 83 employed is not material to our invention and may be of conventional design.

In compliance with R. S. 4888, we have disclosed in the foregoing specification several detailed structures constituting preferred embodiments of our invention. These details, however, have been set forth by way of illustration, rather than by way of limitation, and it should not be understood that we thereby limit the scope of our invention except insofar as defined in the appended claims.

We claim:

1. A storage battery for use in extreme ambient temperatures comprising a container having walls resistant to the transfer of heat and defining inlet and outlet openings for connection with a source of heat transfer liquid, a heater for said liquid having inlet and outlet openings connected in closed circuit with the container, a plurality of storage battery cells in the container, each of the cells having side and bottom walls, and means supporting each of the cells within the container with the cell walls in spaced relation to the container walls and to each adjacent cell wall, thereby defining a plurality of freely intercommunicating passageways for heat exchange liquid, each passageway being defined in part by a major portion of the area of a cell wall.

2. A storage battery for use in low ambient temperatures comprising a generally rectangular container having side and bottom walls resistant to the transmission of heat and defining an inlet opening and an outlet opening for connection with a source of heated liquid, a plurality of generally rectangular storage battery cells in the container, each of the cells having liquid-tight walls, support means for maintaining the walls of each of the cells in spaced relation to each adjacent cell and to the side and bottom walls of the container, thereby defining a plurality of freely intercommunicating passageways within the container, each passageway being defined in part by a major portion of the area of a cell wall and a heater for the liquid connected in closed circuit with the container.

3. A storage battery for use in low ambient temperatures comprising a generally rectangular container having side and bottom walls resistant to the transmission of heat and defining inlet and outlet openings in connection with a source of heated liquid, a plurality of generally rectangular storage battery cells in the container, each of the cells having liquid-tight walls, and a cover secured to the top of the container and defining an opening therein for each of the cells, the edge portions of each of the openings in the cover engaging a cell and maintaining said cells in spaced relation to each other and to the container, thereby defining a plurality of freely intercommunicating passageways for heated liquid in the container, each passageway being defined at least in part by a major portion of the area of a cell wall.

4. A storage battery for use in low ambient temperatures comprising a container having side and bottom walls defining spaced inlet and outlet ports for connection with a source of heated liquid, a plurality of battery cells in the container, each cell having top, bottom, and side walls, cell support means on the bottom of the container supporting the battery cells in spaced relation to each other and to the container, thereby defining freely intercommunicating passageways for heated liquid, each passageway being defined in part by a major portion of the area of a cell wall, and a rigid cover for the container defining an opening for each cell smaller than the external dimensions of said cells and adapted for engagement with the top marginal portion of each cell for maintaining each cell in engagement with said support means.

5. The structure defined in claim 4, which includes a pressure release valve in the cover communicating with said passageways.

6. A storage battery comprising a container having side and bottom walls defining spaced inlet and outlet ports for connection with a source of heat transfer liquid, a plurality of battery cells in the container, each cell having top, bottom, and side walls and a peripheral, laterally extending flange around its upper extremity, support members extending downwardly and laterally from the bottom of each cell for engagement with the container walls and with each other, said support members and flanges on each cell cooperating with corresponding adjacent members and flanges and with the container walls for maintaining the cell walls in spaced relation to each other and to the container walls, thereby defining a plurality of freely intercommunicating passageways extending around the side and bottom walls of each cell for the passage of heated liquid, each of said passageways being defined in part by a major portion of the area of a cell wall and means for sealing said flanges to each other and to the container.

7. The structure defined in claim 6, wherein the support members are fixed to the container.

8. A storage battery for use in low ambient temperatures comprising a container having insulated side and bottom walls defining an inlet and an outlet for connection with a source of circulating heated liquid, a plurality of storage battery cells in the container, each cell having top, bottom, and side walls and binding posts projecting upwardly through the top wall, the said top wall also having a filler opening, collars projecting upwardly from the top wall in spaced relation around the binding posts and filler openings, support means in the container engaging each battery cell for maintaining the side and bottom walls in spaced relation to each other and to the container, and a container cover having a plurality of openings formed therein for the cell binding posts and filler openings and arranged for sealing engagement with the upper surfaces of the said collars and with the container, whereby heated liquid circulating in the container will contact the top, bottom, and side walls of each cell.

9. A storage battery comprising a container having an inlet and an outlet, a plurality of battery cells in the container spaced from each other and from the container and defining freely intercommunicating passageways each bounded in part by a major portion of the area of a cell wall, said passageways communicating with the inlet and outlet, conduit means connected to said inlet and outlet on the container defining therewith a closed circuit for circulating heated liquid, and a heat exchanger in said heated liquid circuit, said heat exchanger being independent of other heat exchanger circuits.

10. A storage battery for use in low ambient temperatures comprising a container having insulated side and bottom walls, an inlet and an outlet spaced from the inlet, said outlet being disposed for substantially draining the container, a plurality of battery cells in the container each having side and bottom walls, means supporting the cells in the container with each cell wall and bottom spaced from the container and from the adjacent cell walls for defining freely intercommunicating passageways for heated vapor, each said passageway being defined in part by a major portion of the surface area of a cell wall, means including said cells for sealing the container, a boiler for condensable liquid disposed below the level of the outlet, a vapor conduit connecting the boiler only with the container inlet, and a condensate conduit connecting the container outlet only with the boiler.

EMMET L. MARTIN.
HOWARD H. AGEE.

References Cited in the file of this patent

UNITED STATES PATENTS

| Number | Name | Date |
|---|---|---|
| 286,259 | Brush | Oct. 9, 1883 |
| 684,697 | Lloyd | Oct. 15, 1901 |
| 746,289 | Chamberlain | Dec. 8, 1903 |
| 925,708 | Lake | June 22, 1909 |
| 1,058,916 | Spear et al. | Apr. 15, 1913 |
| 1,112,861 | Snyder | Oct. 6, 1914 |
| 1,152,247 | Walker | Aug. 31, 1915 |
| 1,266,780 | Edison | May 21, 1918 |
| 1,285,659 | Ford | Nov. 26, 1918 |
| 1,357,598 | Thompson | Nov. 2, 1920 |
| 1,806,659 | Archibald | May 26, 1931 |
| 1,921,806 | Carlson | Aug. 8, 1933 |
| 2,000,780 | Miller | May 7, 1935 |
| 2,273,244 | Ambruster | Feb. 17, 1942 |
| 2,399,941 | Resek | May 7, 1946 |
| 2,405,143 | Holthouse | Aug. 6, 1946 |
| 2,405,145 | Holthouse | Aug. 6, 1946 |
| 2,410,952 | Lighton | Nov. 12, 1946 |
| 2,440,369 | Furman | Apr. 27, 1948 |

OTHER REFERENCES

Automotive & Aviation Industries (publication) pages 94 and 95, Sept. 1, 1944.